United States Patent
Willis

(10) Patent No.: US 10,521,620 B2
(45) Date of Patent: Dec. 31, 2019

(54) CARD HANDLING DEVICE

(71) Applicant: ASAHI SEIKO (EUROPE) LTD., Tunbridge Wells Kent (GB)

(72) Inventor: Marcus Willis, Sittingbourne Kent (GB)

(73) Assignee: ASAHI SEIKO (EUROPE) LTD., Tunbridge Wells Kent (GB)

( * ) Notice: Subject to any disclaimer, the term of this patent is extended or adjusted under 35 U.S.C. 154(b) by 0 days.

(21) Appl. No.: 15/511,161

(22) PCT Filed: Sep. 14, 2015

(86) PCT No.: PCT/GB2015/052649
§ 371 (c)(1),
(2) Date: Mar. 14, 2017

(87) PCT Pub. No.: WO2016/051131
PCT Pub. Date: Apr. 7, 2016

(65) Prior Publication Data
US 2017/0256116 A1 Sep. 7, 2017

(30) Foreign Application Priority Data
Sep. 30, 2014 (GB) .................................. 1417286.0

(51) Int. Cl.
*G07F 11/12* (2006.01)
*G07F 11/04* (2006.01)
(Continued)

(52) U.S. Cl.
CPC ............ *G06K 7/0013* (2013.01); *G06K 13/08* (2013.01); *G07F 7/0893* (2013.01); *G07F 11/04* (2013.01); *G07F 11/12* (2013.01)

(58) Field of Classification Search
CPC ........ G07F 7/0893; G07F 11/04; G07F 11/12; G07F 17/42
See application file for complete search history.

(56) References Cited

U.S. PATENT DOCUMENTS 2,522,316 A * 9/1950 Steiner .................... G07F 11/16
221/273
2,546,986 A * 4/1951 Dressler .................... A47F 1/10
221/111
(Continued)

FOREIGN PATENT DOCUMENTS

EP 0 821 328 1/1998
EP 0 871 150 10/1998
(Continued)

OTHER PUBLICATIONS

PCT International Search Report and Written Opinion, PCT/GB2015/052649, European Searching Authority, dated Dec. 14, 2015, 15 pages.

*Primary Examiner* — Gene O Crawford
*Assistant Examiner* — Kelvin L Randall, Jr.

(57) ABSTRACT

A card handling device is provided comprising a housing having an entrance aperture through which a card can be delivered and an exit aperture from which the card can leave the housing, wherein the exit aperture is located lower than the entrance aperture. A floor member is provided within the housing, onto which a card is delivered after passing through the entrance aperture. The floor member is movable between a first orientation in which it extends towards the exit aperture such that a card can slide along the floor member, under the influence of gravity, towards the exit aperture, and a second orientation in which it extends away from said exit aperture so that in use a card can slide along the floor member under the influence of gravity away from the exit aperture. A control system is also provided for controlling movement of the floor member between the first orientation and the second orientation.

10 Claims, 11 Drawing Sheets

(51) Int. Cl.
*G07F 7/08* (2006.01)
*G06K 13/08* (2006.01)
*G06K 7/00* (2006.01)

(56) References Cited

U.S. PATENT DOCUMENTS

| | | | | |
|---|---|---|---|---|
| 2,585,872 A | * | 2/1952 | Steiner | G07F 11/12 |
| | | | | 221/104 |
| 4,789,079 A | * | 12/1988 | Kobayashi | G07F 11/04 |
| | | | | 271/143 |
| 5,240,143 A | * | 8/1993 | Kornegay | G07F 11/045 |
| | | | | 221/202 |
| 5,379,101 A | * | 1/1995 | Takahashi | G03G 15/234 |
| | | | | 271/9.11 |
| 5,941,414 A | * | 8/1999 | Kasper | G07B 3/04 |
| | | | | 221/210 |
| 6,168,151 B1 | * | 1/2001 | Tsuchida | G07F 11/04 |
| | | | | 221/231 |
| 6,957,025 B1 | * | 10/2005 | Sinn | G03G 15/6508 |
| | | | | 399/23 |
| 8,167,295 B2 | * | 5/2012 | Hashimoto | B41J 13/0018 |
| | | | | 271/9.02 |
| 9,969,589 B2 | * | 5/2018 | Sezaki | B65H 29/58 |
| 2003/0010827 A1 | * | 1/2003 | Hilton | G06K 13/10 |
| | | | | 235/475 |
| 2003/0155370 A1 | | 8/2003 | Martin et al. | |
| 2009/0001095 A1 | * | 1/2009 | Yamamiya | B65H 1/06 |
| | | | | 221/268 |
| 2009/0261524 A1 | * | 10/2009 | Nakayama | B65H 3/44 |
| | | | | 271/3.14 |
| 2011/0097130 A1 | * | 4/2011 | Hashimoto | B41J 13/0018 |
| | | | | 400/583 |
| 2015/0112478 A1 | * | 4/2015 | Bettez | G07F 17/42 |
| | | | | 700/233 |
| 2017/0326437 A1 | * | 11/2017 | Sampson | A63F 1/12 |

FOREIGN PATENT DOCUMENTS

| | | |
|---|---|---|
| FR | 2 618 001 | 1/1989 |
| FR | 2 879 325 | 6/2006 |

\* cited by examiner

CARD HANDLING DEVICE

The present invention relates to card handling devices and card dispensers. An example application of the invention is to provide a means for controlling the movement of contactless cards issued from a cassette within a card dispenser, to allow for communication with the card to occur and to provide a subsequent means of physical control.

Card handling devices are integrated within card dispensers, such as those incorporated into ticket vending/issuing machines provided at parking lots, public transport stations, laundrettes and shops. These vending machines issue cards containing secure elements (such as chips or magnetic strips) onto which data is encrypted in accordance with selections made by a user purchasing the card from the vending machine. Typical cards issued by these machines include contact cards and contactless cards (also referred to as smart cards) including for example prepaid, credit, debit, charge and pay-as-you-go payment cards.

An example of a prior art card handling device 40 distributed by Asahi Seiko (Europe) Limited for use with either contact or contactless cards is shown by FIG. 12. An input 42 for the device 40 is configured to receive a card from a cassette (not shown) containing a stack of blank cards. A drive assembly 44 comprising a system of belts and rollers driven by motors is configured to move a lowermost card from the cassette to a communication module 43, wherein data is encoded onto the card. In the case of traditional contact cards, it is essential that the terminal of the communication module 43 accurately aligns with the card contacts to connect to the secure element of the card wherein data may be stored. This is achieved through carefully controlled movement of the card across and into the communication module 43 by the drive assembly 44. In the event that the device 40 is configured for use with contactless cards, an appropriate communication module 43 adapted for contactless communication is fitted instead. The drive assembly 44 moves a blank card from the input 42 in a first direction through the communication module 43. The drive assembly 44 will then reverse its direction so as to move the card in a second direction, opposite the first direction to position the card for communication to take place. The host control subsequently reads this data back to check that it has been correctly encoded onto the secure element. If the encoded data is not corrupted (i.e. if the data was correctly encoded), the drive assembly 44 will once again move the card in the first direction from the input 42 to the output bezel 41 where it is retrieved by a user. If the data is corrupted, the initial card is captured internally and the process may be repeated. The card may then be reinserted at the bezel 41 at a later date in order to read or update the data stored on the card by use of the communication module 43, for example if the user wishes to make a purchase using the card. In certain applications, particularly transportation, the card may be issued into a collection tray without a need or desire to re-insert the card into the issuing machine at a later date. The process of dropping a card into a tray helps prevent damage or tampering with the issuing machine through an open bezel. The drive assembly 44 required to perform the above process occupies significant space within the ticket vending machine and is also prone to mechanical failure. It would thus be desirable to provide a new card handling device that overcomes these deficiencies.

In accordance with a first aspect of the invention, there is provided a card handling device comprising:
- a housing having an entrance aperture through which a card can be delivered and an exit aperture from which the card can leave the housing, wherein the exit aperture is located lower than the entrance aperture;
- a floor member within the housing and onto which a card is delivered after passing through the entrance aperture, the floor member being movable between a first orientation in which it extends towards the exit aperture such that a card can slide along the floor member, under the influence of gravity, towards the exit aperture, and a second orientation in which it extends away from said exit aperture so that in use a card can slide along the floor member, under the influence of gravity, away from the exit aperture; and
- a control system for controlling movement of the floor member between the first orientation and the second orientation.

A card handling device is thus provided that has fewer moving parts to it than the prior art apparatus, meaning that the device can be manufactured more easily and at less expense. Rather than relying on belts, rollers and motors, movement of a card through the device is instead driven by the influence of gravity onto the card resting against the floor member. This mechanism is less prone to mechanical failure and so improves the reliability of the device. Furthermore, the relatively simple set-up means that the device takes up less space and is quieter than previous card handling devices allowing for card vending machines to be reduced in size. Further still the device can also be very easily retrofitted to a conventional card dispenser.

A particular benefit is realised wherein the card handling device further comprises a card communication module, wherein said control system is operated in accordance with an output from said card communication module. For example, the control system may be operated in accordance with an output issued from said card communication module indicating that data has been correctly or incorrectly encoded to a card. This card communication module is preferably adapted to communicate with the card, so as to read and/or write data onto the card. The card communication module may communicate with the card either through known contact or contactless communication techniques. In order to do this, the card may comprise any of a transmitter, a receiver, contact terminals and signal processing equipment including processors and memory as necessary.

Although the card handling device could in principle be used with traditional contact cards (such as Integrated Circuit "IC" cards and contact cards having magnetic tape onto which data may be stored), it is particularly well suited for use with contactless cards. In order to facilitate the use of the card handling device with contactless cards, said communication module is preferably adapted for contactless communication with said card. An additional benefit of the device becomes apparent in this instance since, unlike contact cards, it is not necessary to ensure that an accurate physical contact or alignment is achieved between a terminal of a card communication module and the secure element of the card. Furthermore, the card does not need to be traversed back and forth through the communication module in order to read from, or write data to, the card. Contactless communication may instead occur between the card and the communication module within a range of positions and whilst the card is stationary or not. This reduces the horizontal length of the card handling device and creates greater design freedom. Once issued, the card may be read or encoded at a later date by a separate contactless communication module provided outside of the device, without the need to be reinserted into the card handling device. In the event that the device is intended for use with contact cards, an appropriate communication module configured for contact communication with a card may be provided, including a connector configured to connect with a chip or magnetic strip provided on said card.

A pre-encoded or blank card containing data or no data as applicable may be initially provided into the housing of the device through the entrance aperture and allowed to slide along the floor member orientated at the first orientation until it is within range of the communication module. The communication module is preferably configured to encode data onto said card, for instance in response to a purchase made by a user of a vending machine into which the card handling device is incorporated. The card communication module may be further configured to read data encoded onto said card, e.g. to verify it has been correctly written to the card. In order for the card communication module to be within range of communicating with the card before the card is dispensed, said card communication module is preferably configured to communicate with a card which is located on the floor member. The card communication device may thus communicate with the card, whilst the card is resting against the floor member. This is preferably achieved by mounting the card communication module adjacent to said floor member, between the entrance and the exit aperture. Alternatively (or in addition to this), said card communication module may be configured to communicate with a card which protrudes from the entrance aperture. This may allow the card to come into range of the card communication device for communication to occur before it comes into contact with the floor member 5, or before it is allowed to slide along said floor member. This is typically achieved by mounting the card communication device adjacent to the entrance aperture. Furthermore a mechanical member may be also provided which is configured to hold a card which protrudes from the entrance aperture, wherein said mechanical member is controlled by the control system. For example the card may be partially inserted through the entranced aperture at this stage. Further still, said mechanical member is preferably further configured to release said card in response to an output from the card communication module. This output may indicate, for example, that the data on the card has been read, a verification process has been completed, or that the floor member has been moved.

A further benefit is realised wherein the control system is adapted to move said floor member from the first orientation to the second orientation in response to an output from the card communication module indicating that data encoded onto the card is corrupted. For instance, having encoded data onto a secure element provided on the card and having then subsequently read this data, the card communication module may compare the monitored card data against source data (which was supposed to be written onto the card) and determine that an error had occurred in the encoding process leading to the data being corrupted. In this instance, the floor member is moved to the second orientation so that the card is dispatched below the floor member, typically to a location which is not generally accessible to a device user.

In order to retain the card for a sufficient time within the device for communication with the card to occur, said exit aperture preferably further comprises a gate, wherein said control system is further configured to open and close said gate so as to allow or prevent the movement of said card through the exit aperture. The movement of a card through the exit aperture may hence be controlled by opening or closing the gate, whilst the card is urged against said gate under gravity. The control system is preferably adapted to open said gate in response to an output from the card communication module indicating that data encoded onto the card is not corrupted. This would be the case for instance if the card communication module read the data previously encoded onto the card and verified that it matched the source data which was intended to be encoded and that no errors occurred during the encoding process. In this instance, the gate may be opened by the control system so as to allow the card to slide along the inclined floor member under the influence of gravity and out of the housing through the exit aperture whilst the floor is at the first orientation. The gate is preferably biased towards a closed position so as to prevent a blank card, containing no encoded data from exiting the device via the exit aperture. The device preferably further comprises a solenoid configured to open and close said gate under the control of the control system.

Preferably still the apparatus may further comprise a card sensor configured to monitor the presence of a card resting against the floor member. The card sensor is preferably in electrical communication with the control system of the card dispenser and may comprise, for example, an optical sensor. Furthermore, the control system may be configured to move the floor member either to the first orientation or the second orientation, and/or actuate the gate, depending on the output from the card sensor.

Preferably, in the first orientation, the floor member extends from adjacent the entrance aperture towards the exit aperture such that a card can slide along the floor member, under the influence of gravity, towards the exit aperture. The floor member preferably makes a first non-zero angle with the horizontal at said first orientation, wherein said first angle is preferably between 30 and 60°, more preferably around 45° (for example plus or minus 5°). This orientation allows the card to slide along the floor member from the entrance aperture towards the exit aperture, without the need for a moving drive assembly including, for example, belts, rollers and motors. Preferably in the second orientation, the floor member extends below the first orientation so that in use a card can slide along the floor member under the influence of gravity away from the exit aperture. Said floor member preferably makes a second non-zero angle with the horizontal at said second orientation, wherein said second angle is larger than the said first angle and is preferably between 45 and 90°, more preferably around 90° (for example plus or minus 5°). By use of the control system, the device may dispatch the card to either of two locations. For instance, the said device may preferably further comprise a bin mounted below said floor member; wherein said bin is configured to receive a card from said floor member when said floor member is at said second orientation. This bin is typically not accessible to a device user, although may be during maintenance. Preferably still, said device may further comprise a collection tray mounted lower than said aperture; wherein a said collection tray is configured to receive a card from said exit aperture. By contrast, this collection tray may typically be accessible to a device user. This configuration allows the device to maintain a small width (along the direction of card travel and perpendicular to the direction of gravity).

In order to achieve movement of the floor member between the first orientation and a second orientation, said floor member preferably further comprises a pivot provided on its end adjacent to said entrance aperture. Alternatively however the pivot may be provided on the opposing end, adjacent to the exit aperture, however the floor member would then need to be moved by a greater angle (in the opposite direction) in order to slide the card away from the exit aperture. Furthermore, a benefit is provided wherein said control system further comprises an actuator configured to move said floor member between the first orientation and the second orientation. Said actuator may preferably comprise a solenoid.

Once a card has been dispatched from the card dispenser, a new card may be delivered to the entrance aperture from a cassette provided upstream comprising a stack of cards. This cassette will only be able to hold a finite number of cards and so, in order to prolong the length of time between when a cassette next needs to be replaced, it is known to provide two cassettes within the dispenser, wherein a second cassette is automatically mechanically moved to a dispense position to replace a first cassette that has run out of cards. The process of moving one cassette away from the dispense position and another cassette towards the dispense position typically takes considerable time; during which a user will not be able to retrieve a card. Furthermore, a mechanical drive assembly comprising a track, belts and a motor is required to move each cassette. Alternatively, two independent transport paths with respective drive assemblies may be provided to transport cards from two stationary cassettes towards a single dispense position. These drive assemblies are prone to mechanical failure and occupies significant space, increasing the overall size of the card dispenser. It would thus be desirable to overcome the abovementioned deficiencies in the prior art.

In accordance with the second aspect of the invention there is provided a card dispenser comprising:
- a first card cassette configured to hold a first stack of cards;
- a first feed device operable to move the end card of the first stack of cards from the first cassette, through an opening in a surface of the first cassette, towards a dispense position;
- a second card cassette configured to hold a second stack of cards and located upstream of the first cassette; and
- a second feed device operable to move the end card of the second stack of cards from the second cassette, through an opening in a surface of the second cassette, into the first cassette;
- wherein the first feed device is further operable to move the end card of the second stack of cards from the first cassette, through the opening in the surface of the first cassette, towards the dispense position;
- the card dispenser further comprising a retractable member configured to prevent the movement of a card from the first cassette into the second cassette.

A card dispenser is provided comprising two cassettes for an increased supply of cards, wherein it is no longer necessary to move each cassette itself in order to deliver a card from said cassette to a dispense position. The first and the second card cassettes may instead be fixed in their respective positions, with a second feed device being used in conjunction with the first feed device to move a card from the second cassette towards the dispense position. This reduces the number of moving parts thereby leading to an increase in the reliability and a decrease in the size of the apparatus. Furthermore, this has the added benefit that it is no longer necessary for a user to wait whilst a second cartridge is being moved into position, in order to receive a card.

The first feed device may occasionally be reversed in direction (i.e. away from the dispense position), for example to clear a jam wherein cards within the first stack have adhered together. It is therefore desirable for the opening to remain closed when a card is not passing from the second cassette to the first cassette so as to not transport a card unnecessarily from the first cassette into the second cassette. This is achieved by the retractable member, which may prevent the movement of a card from the first feed device to the second feed device.

The cards in the first stack are preferably substantially similar to the cards in the second stack. For example, the cards in the first stack may be identical in thickness, size and type to those in the second stack, such that cards from the second stack may be used in place of those from the first stack when the first cartridge is empty. Most typically the cards in both stacks are substantially planar in shape.

The cassettes are preferably vertically arranged and the end card is preferably the lowermost card; i.e. the end card in the first stack is preferably the lowermost card in the first stack and the end card in the second stack is preferably the lowermost card in the second stack. Where this is the case the cassette may be naturally fed towards the first or second feed devices by gravity. Alternatively however the cassettes may be stacked in the opposite direction with a spring being used to move the uppermost card (which is now the end card) to the respective feed device. In principle also the cassettes may be horizontally orientated instead with respect to the ground.

It is particularly advantageous wherein the card dispenser further comprises a cassette controller, wherein said cassette controller is configured to control said first feed device and said second feed device. The cassette controller is preferably an electronic controller and may comprise logic, one or more processors and memory as necessary in order to control the first feed device and the second feed device (together or independently).

Said retractable member may be configured to be retracted into an open position in response to a card pressing against said retractable member and moving in a first direction from the second cassette towards the first cassette. The retractable member may form part of the first or the second cassettes, the second feed device or alternatively some other part of the card dispenser. Preferably however said retractable member is provided on the opening of the second cassette and is configured to open and close said opening. The retractable member preferably does not require active control by an electronic cassette controller and may instead be driven mechanically, for example, by a spring. Said retractable member is preferably biased towards a closed position, wherein it prevents the movement of a card from the first cassette to the second cassette, and will remain in said closed position in response to a card pressing against said retractable member in a second direction, opposite to the first direction, from the first cassette towards the second cassette. This may be achieved, for example wherein said retractable member comprises an inclined surface with respect to the horizontal and the vertical, wherein said retractable member is adapted to move in a non-parallel direction in response to the movement of a card in the second direction against said inclined surface. Said non-parallel direction is preferably perpendicular to the direction of movement of the card. Alternatively said retractable member may be configured to pivot in response to a card being pressed against it.

It is particularly advantageous to provide a sensor configured to monitor the presence of a card at said first feed device in the first cassette. The sensor is preferably in electronic communication with the cassette controller. Furthermore, in one advantageous arrangement said retractable member is a gate configured to be opened and closed by said cassette controller. For example, the cassette controller may be configured to close said gate when a card is detected by the sensor at said first feed device so as to prevent movement of a card from the first cassette to the second feed cassette. Similarly, said cassette controller may be configured to open said gate when a card is not detected by the sensor at said first feed device so as to allow movement of a card from the second cassette to the first cassette. Alternatively, the gate may be controlled by the cassette controller independently of the output from a card sensor.

Preferably, a first transport path is provided for moving a card from the first cassette to the dispense position, and a second transport path is provided for moving a card from the second cassette onto the first transport path at the first cassette. Thus, the first and second transport paths together in series effectively form a single transport path along which cards can be conveyed to the dispense position from either the first or the second cassette.

The overall size of the card dispenser may most effectively be reduced wherein the card dispenser further comprises a card handling device in accordance with the first aspect of the invention.

Examples of the present invention will now be described with reference to the accompanying drawings, in which.

Figure 1:
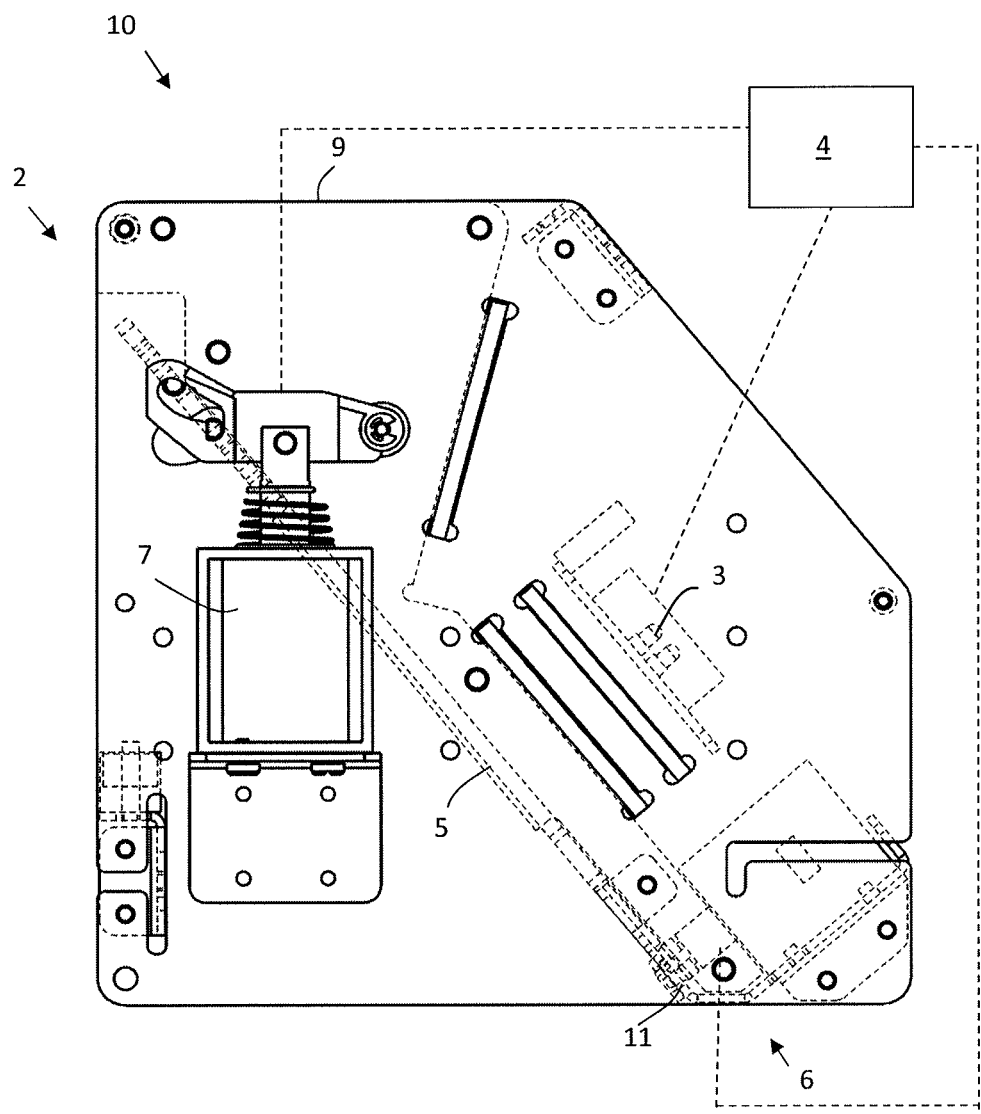
FIG. 1 is a schematic cross-section of an example of a card handling device in accordance with an example of the invention.

A cross-sectional view of an example of a card handling device 10 is shown by FIG. 1. A housing 9 is provided onto which several components of the device 10 are fixed. The housing 9 has an entrance aperture 2 and an exit aperture 6 provided at the top and the bottom of the device 6 respectively, at either ends of a floor member 5 is held at a first orientation. The floor member 5 is pivotally mounted to the housing at its end adjacent to aperture 2 and makes a first non-zero angle with the horizontal (typically sea/ground level) when at the first orientation (in this case 45°). In this example the floor member 5 does not extend all the way to the entrance aperture 2 but extends from a surrounding area adjacent to it. In alternative examples however the floor member 5 may abut onto the entrance aperture 2.

Whilst at the first orientation, a card may be inserted into the device 10 at the entrance aperture 2 such that it can slide along the floor member 5 towards a gate 11 provided upstream of the exit aperture 6, under the influence of gravity. A solenoid (or alternatively a motor) is provided within the gate 11 for opening or closing the gate so as to allow or prevent the card from moving through the exit aperture 6. In this example the floor member 5 is made of a common plastic, Acrylic or Perspex for example, which may be ribbed to reduce surface contact and/or is coated in a low friction substance such as PTFE or Teflon so as to allow the card to slide freely. In alternative embodiments the floor member 5 may consist wholly or partly of a set of one or more rollers manufactured, for example, from Delrin to aid sliding.

A card communication module 3, adapted for contactless communication with a contactless card (or smart card), is provided adjacent to the floor member 5. The module 3 is typically parallel to the floor member 5 (at its first orientation) and laterally offset from it by between 1 and 10 cm. The card communication module 3 comprises suitable known means for encoding and reading data to or from a contactless card, including an antenna, one or more processors and memory.

An actuator 7, comprising a solenoid and a spring mechanism, is connected between the floor member 5 and housing 9 and is configured to move the floor member 5 in a clockwise manner about the pivot from the first orientation to a second orientation. Whilst at the second orientation, the floor member 5 extends below the first orientation, so that in use the card can slide along the floor member 5 away from the exit aperture 6. At its second orientation, the floor member 5 makes a second non-zero angle, which is larger than the first angle with respect to the horizontal. In this case the second angle is approximately 90° (i.e. vertical).

The solenoids provided within the actuator 7 and the gate 11 are controlled by an electrical control system 4 (shown in FIG. 1 only for clarity purposes), which is in communication with the card communication module 3 so as to control the movement of a card within the device 10 in accordance with an example of the invention to be discussed. Electrical cabling indicating communication between the gate 11, actuator 7, the communication module 3 and the control system 4 is shown by the dashed lines in FIG. 1.

Figure 2:
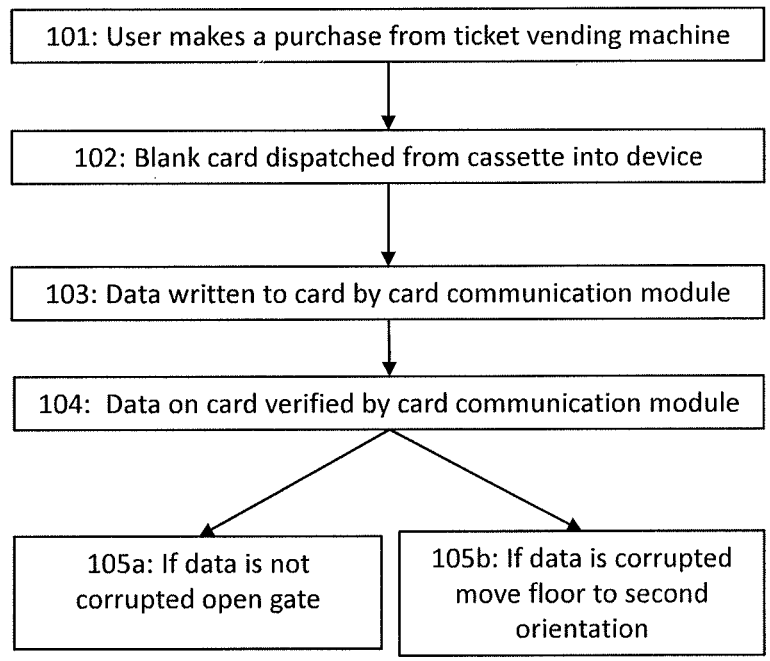
FIG. 2 is a flow chart of a method for operating a card handling device in accordance with an example of the invention.
Figure 3:
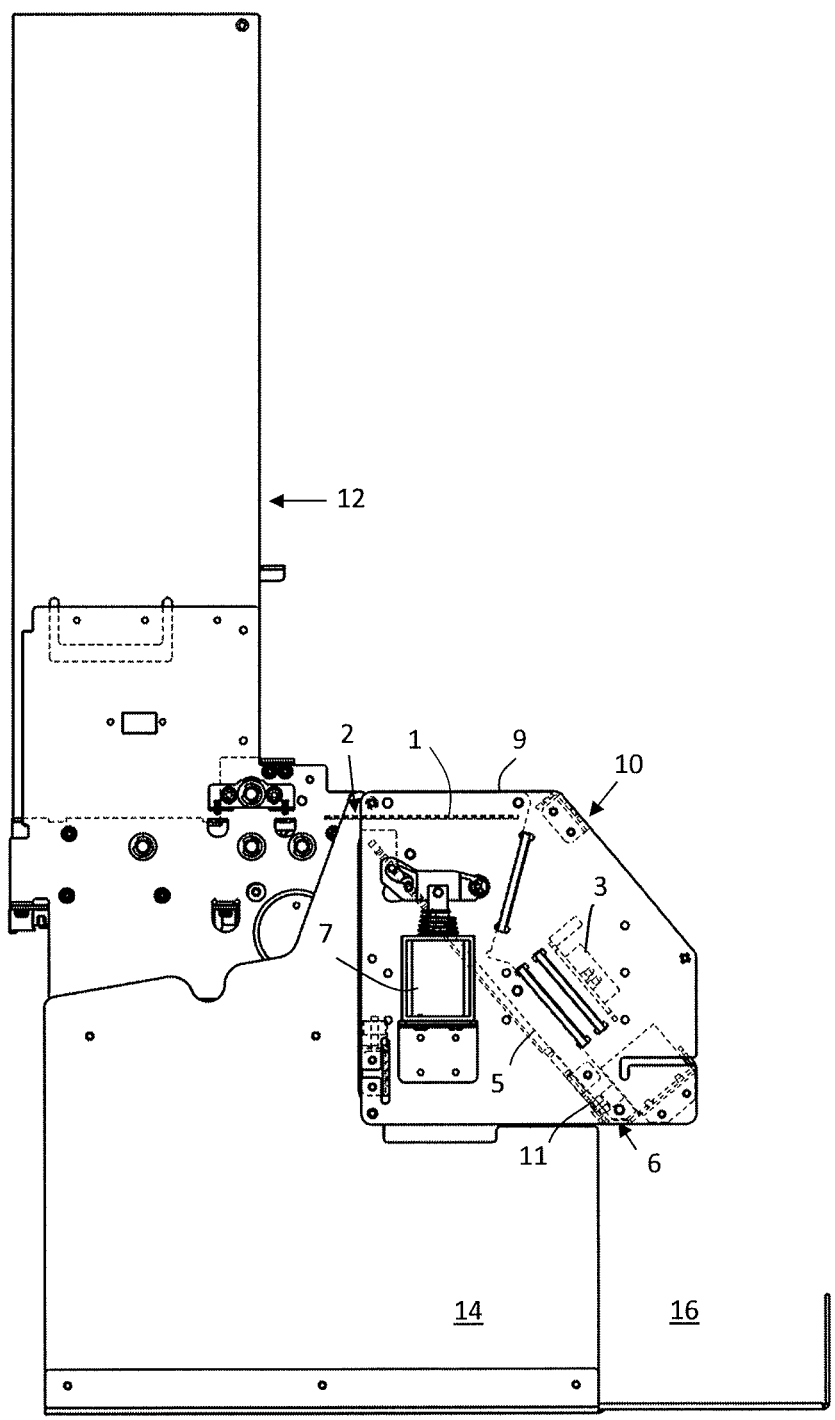
FIGS. 3-6 are illustrations of a card handling device operated in accordance with the method of FIG. 2.
Figure 4:
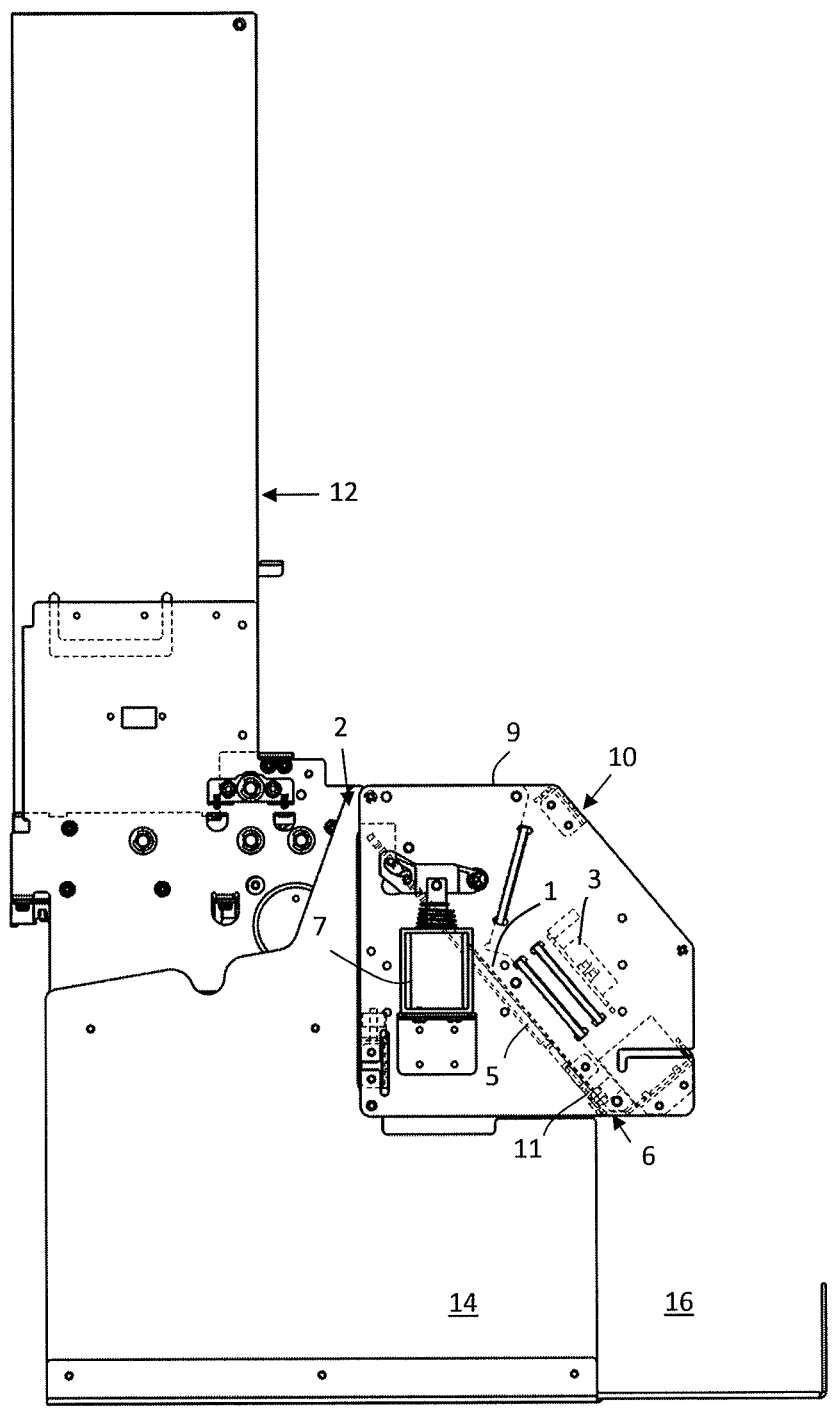

A flow diagram illustrating a method for operating the card handling device 10 is shown by FIG. 2 and will be discussed with reference to the illustrations in FIGS. 3-6. At step 101 a user purchases a ticket from a ticket vending machine into which the device 10 is incorporated. A 'blank' contactless card 1 containing no stored data is subsequently dispatched at step 102 from the bottom of a cassette 12 containing a stack of blank cards into the entrance aperture 2 of the device 10, as shown by FIG. 3. This is achieved by suitably controlling a drive mechanism (not shown) in the base of the cassette 12. The card 1 comprises an integrated circuit or 'secure element' onto which data can be stored. The card 1 is inserted through the entrance aperture 2 and allowed to slide along the floor member 5, which is held at the first orientation, under the influence of gravity, until it reaches and rests against a closed gate 11 so that the secure element/chip of the card is within range of the card communication module 3 (as shown by FIG. 4). The gate 11 is biased towards a closed position to prevent a card 1 from exiting the device 10 in an undesired state or time, in terms of the communication/encoding process, during normal use.

At step 103, data is written onto the card 1 by the card communication module 3 in accordance with a purchase made by the user. This data transfer is achieved through an electromagnetic interaction between an antenna within the module 3 and the secure element. Once the data has been encoded onto the card 1, this data is then verified by the module 3 at the step 104. This process involves reading the data that is written onto the card 1 and comparing it against the source data which the card communication module 3 attempted to the card 1.

Figure 5:
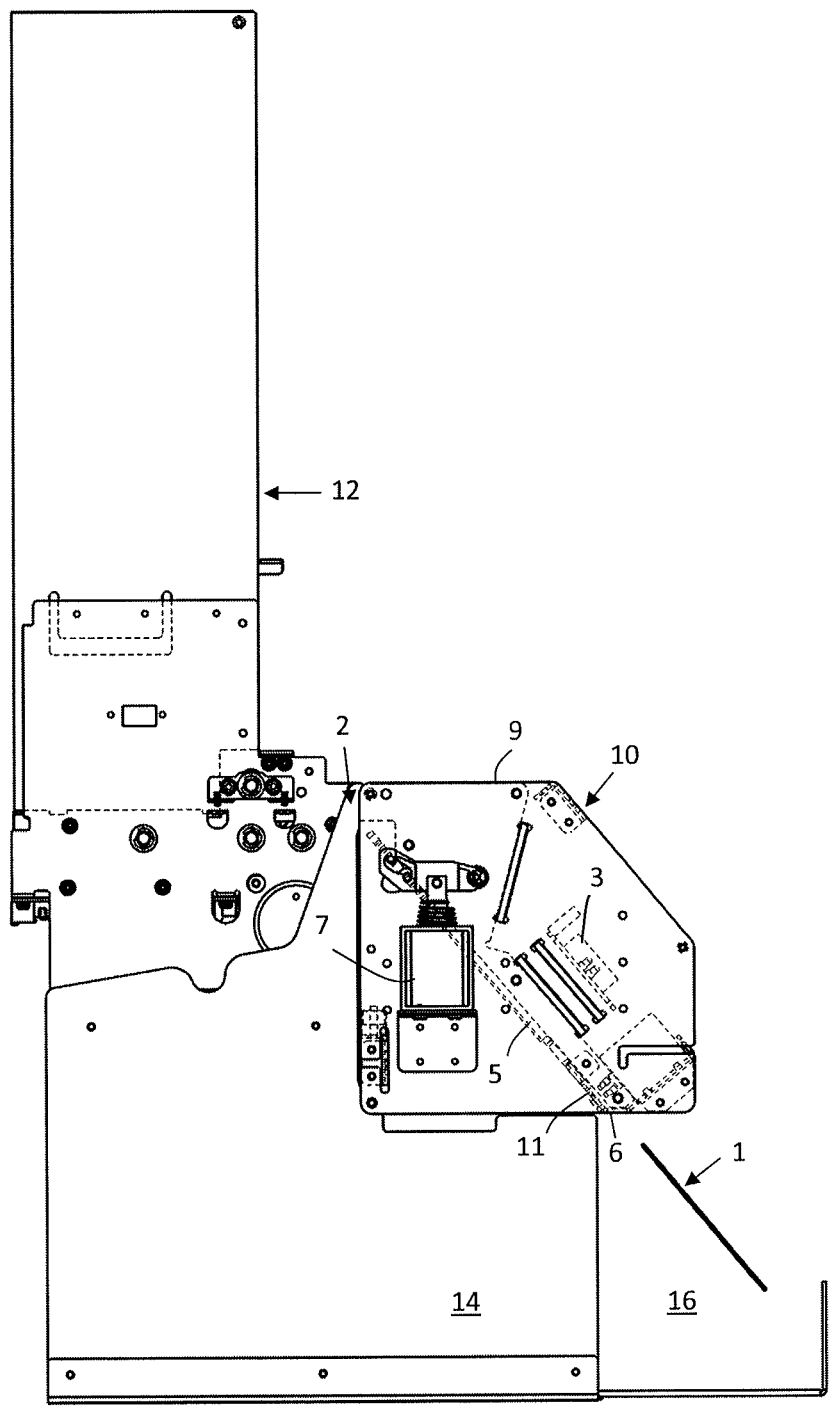
Figure 6:
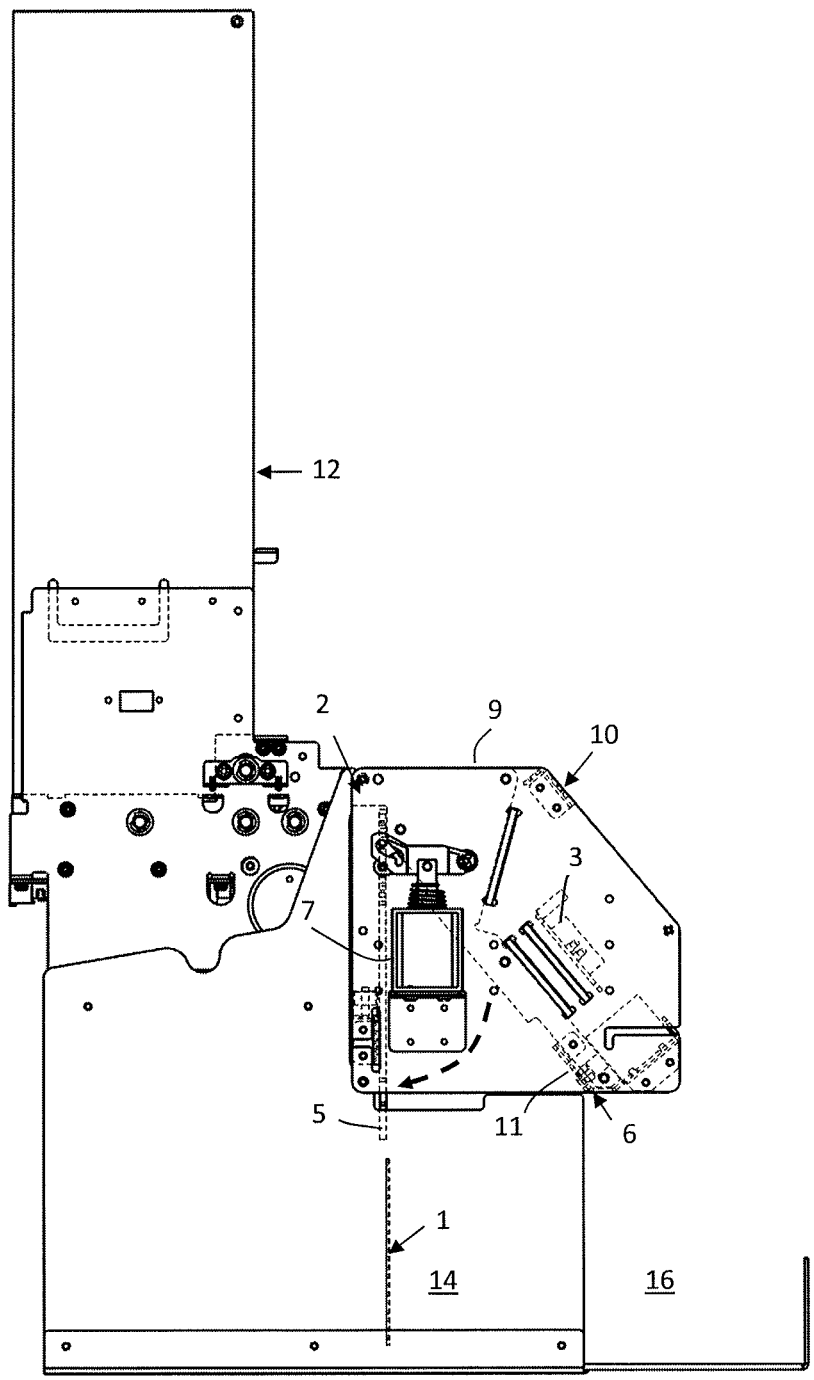

If the result of the verification process of step 104 indicates that the data encoded onto the card 1 contains no errors, the card communication module 3 sends an electrical signal to the control system 4 causing it to trigger the solenoid within the gate 11 to open said gate 11 (e.g. by opening a mechanised flap, or in this case by moving a retractable member shown protruding from the solenoid in the gate 11). This allows the card 1 to slide along the floor member 5 and out of the exit aperture 6 under the influence of gravity, as shown by FIG. 5. This is step 105*a*. Once the card 1 has exited the housing 9 by the exit aperture 6, it falls into a collection tray 16 which is laterally offset from the floor member 5 and is lower than said floor member 5. Once issued it is not necessary to re-insert a contactless card into the device 10 (e.g. via a bezel) in order to update the information stored on the card. The contactless card can instead later be touched against a second contactless card communication module provided on the exterior of the vending machine. This is advantageous because by providing an alternative means for later reading or updating card data once a card has been issued, the exit aperture 6 may remain hidden within the housing of the ticket vending machine and not exposed to a user. This in turn protects the exit aperture 6 from being tampered with.

If the result of the verification process in step 104 indicates that the data encoded onto the card 1 contains errors and does not match the source data which the communication module 3 had intended to write to the card 1, the card communication module 3 instead outputs a signal to the control system 4 indicating that the data is corrupted. The control system 4 will then trigger the solenoid in the actuator 7 to drive the floor member 5 in a clockwise direction to its second orientation as shown by the dashed arrow in FIG. 6. In alternative examples, the floor member 5 is moved by a lesser extent away from the exit aperture 6 so that it is not vertical, but still makes a larger angle with the horizontal than it previously did at its first orientation. Alternatively the floor member 5 may be relaxed so as to fall under gravity about the pivot to a second orientation. The floor member 5 effectively behaves as a trap door at step 105*b* dropping the card 1 from the floor member 5 into a bin 14 provided directly below the floor member 5. The bin 14 is separate from the collection tray 16 and is generally not accessible to a device user, although may be accessed and emptied during maintenance. This provides a failsafe mechanism to prevent a faulty card from being issued to the device user. Once the card 1 has been dispatched into the bin 14, the control system 4 causes the actuator to move the floor member 5 back into its first orientation and steps 102-105*a/b* are repeated until a card is dispatched to the collection tray 16 for the user to collect.

In an alternative example the card which is dispatched at step 102 may comprise pre-encoded data and the card communication module 3 may be configured to read said data at step 103 and not write any data onto the card. In this case the verification step 104 may comprise checking the pre-encoded data to see whether it has been corrupted, e.g. if it is readable, or whether the data on the card matches source data retrieved from memory.

Figure 7:
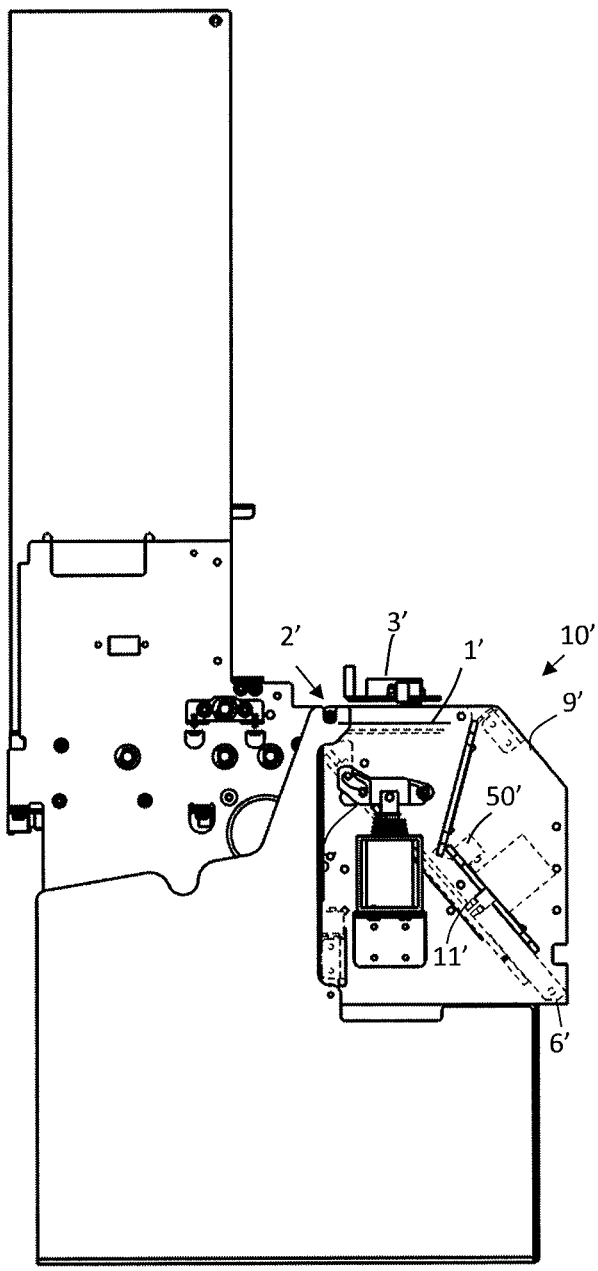
FIG. 7 is an illustration of a card handling device in accordance with a further example of the invention.

A further example of a card handling device 10' is provided in FIG. 7. This example matches the previous examples however the overall depth of the card handling device 10', in the direction of card transport and perpendicular to the direction of gravity, has been reduced by moving the contactless card communication module 3' upstream of its previous location. In this example the card communication module 3' is mounted adjacent to the entrance aperture 2' and is configured to communicate with a card 1' which is still at least partially engaged with (i.e. located inside) the entrance aperture 2'. Although the card communication module 3' is shown here as being mounted to the outside of the housing 9', it may alternatively be mounted to the inside of the housing 9'.

A card 1' is dispensed into the card handling device 10' using the entrance aperture 2', as before. A mechanical member is provided however to control the movement of the card through the entrance aperture 2'. In one example the mechanical member takes the form of a drive mechanism, such as a motorised belt or roller. This drive mechanism may be provided on the card dispenser or the card handling device 10', adjacent to the entrance aperture 2', or alternatively it may form part of the entrance aperture 2' itself. A card 1' is held by the drive mechanism within range of the card communication module 3' for contactless communication to occur. Most typically the card 1' protrudes from the entrance aperture 2' at this point and is, for example, only partially dispensed from the card dispenser into the device 10'. Data is then read or written onto the card and then verified, as before, with the floor member 5' being moved to the first or second orientation depending on the outcome of the verification process using the control system of the card handling device. The control system subsequently sends a signal to the mechanical member causing it to dispense the card 1' fully into the housing 9', through the entrance aperture 2'.

Alternatively however the card 1' may be held in position at the entrance aperture 2' by a mechanical member in the form of an entrance gate. Said entrance gate may comprise one or more retractable members configured to grasp the card 1' so as to hold it at the entrance aperture, within range of the card communication device 3' for contactless communication to occur. Once the verification process has been completed, the entrance gate may release the card 1' onto the floor member 5' below, which is either orientated in the first or the second orientation.

In this example, a card sensor 50' is provided inside the housing 9' and configured to detect the presence of a card resting against the floor member 5' orientated at the first orientation. The card sensor 50' may comprise an optical sensor, for example, which is in electrical communication with the control system of the card dispenser 10'. A gate 11' is provided, as before, for controlling the movement of a card 1' through the exit aperture 6' under gravity. The control system is configured to trigger the gate 11' to open if a card 1' is detected by the card sensor 50', so as to allow the card 1' to exit the device 10'. If a card 1' is not detected, the control system will ensure that the gate 11' remains closed so as to help prevent tampering of the device 10' by an external user.

It should be immediately apparent by a comparison of FIG. 7 with FIG. 3-6 that the depth of the card handling device 10' is reduced by this alternative configuration. This is advantageous as it allows the device 10' to be incorporated into smaller card vending machines that occupy less floor space.

In a further advantageous example, the gate 11' and the card sensor 50' may be removed so as to allow the card to slide uninterrupted along the floor member 5' when it has been dispensed from the entrance aperture 2'. This is possible since as the floor member 5' will have already been moved to its appropriate orientation depending on the verification process before the card begins to move along the floor member 5'. This enables further size and cost reductions, and efficiency enhancements as will be appreciated.

In a yet alternative example, the card could be dispensed from an entrance aperture onto a horizontal floor member provided beneath (where it will initially lay stationary). The floor member could then rotated, for example about a central pivot, in either direction so as to slide the card either towards an exit aperture or away from the exit aperture as before, by the control system thus removing the need for a gate component. In this example the verification process could occur when the card is protruding from the entrance aperture (as in FIG. 7), or could occur whilst the card is lying on the floor member, for example using a card communication module provided on the underside of the floor member.

Figure 8:
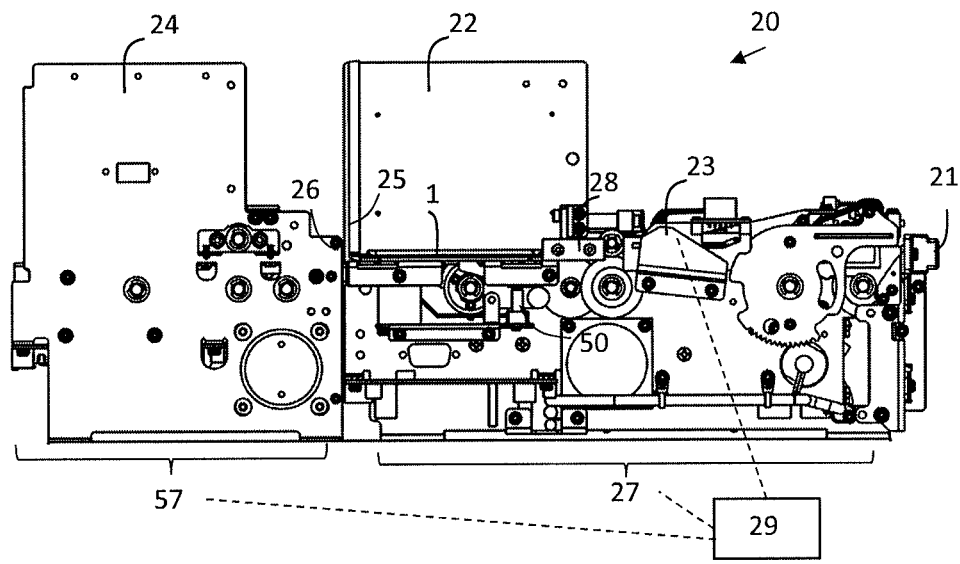
FIGS. 8 and 9 are illustrations of a first example of a card dispenser in use.
Figure 9:
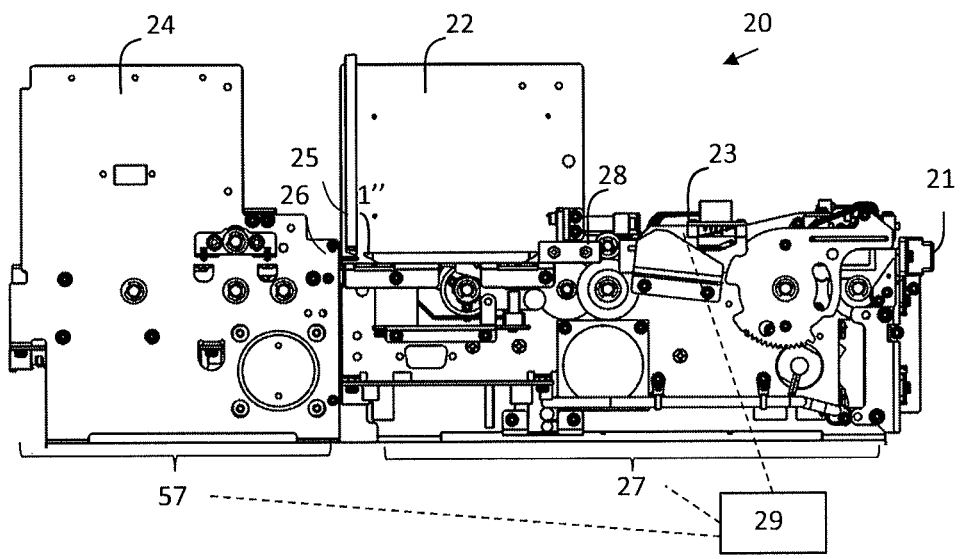

A cross-sectional view of a first example of a card dispenser 20 according to the invention at different stages in use is shown by FIGS. 8 and 9. The card dispenser 20 comprises a first vertically orientated cassette 22 configured to hold a first stack of cards. A second cassette 24 is configured to hold a second stack of cards and is located upstream of the first cassette 22 in a front-to-back manner. The first and second cassettes 22, 24 are connected to first and second feed devices 27, 57 respectively. The first and second feed devices 27, 57 comprise a system of belts and rollers driven by motors is provided underneath the said cassettes 22 to move an end card 1, in this case the lowermost card 1, from the a stack in a first direction towards a dispense position 21, or in a second direction (opposite to the first direction) away from said dispense position 21. Each cassette 22, 24 is connectable to, and detachable from, the first and second feed devices 27, 57 to enable the first and second cards in either cassette to be replaced.

In this example, the card communication module 23 is configured to read and write data to a card 1 by contacting a magnetic strip provided on said card at a terminal of the communication module 23. In the event that the device is configured for use with an IC contact card, the communication module 23 may comprise a landing type connector which is drawn onto the chip/pads of an IC contact card once said card has entered the module 23. In alternative examples however, such as that shown in FIG. 11, the card communication module may be adapted for contact or contactless communication with applicable cards.

A first sensor 50 is provided within the first feed device 27 at the base of the first stack for detecting the presence of an end card in the first cassette 22. In this example sensor 50 is a depressible lever however alternative suitable sensors include through beam or reflective photo-electric sensors/light gates and depressible pins. In addition to this, a second sensor is provided within the second feed device 57 to detect the presence of a card within the second cassette 24. Each sensor is in electrical communication with a cassette controller 29.

An opening 26 is provided in the back surface of the first cassette 22 (upstream of the first feed device 27) and the front surface of the second cassette 24 to allow a card to pass from the second cassette 24 to the first cassette 22. In this example the opening 26 comprises a retractable/depressible member 25 provided on the first cassette 22 which is spring biased towards a closed position (wherein the opening is closed). Alternatively the retractable member 25 may be provided on the front surface of the second cassette 24. The retractable member 25 has a flat vertical face on its downstream side and an inclined face with respect to the horizontal/vertical on its upstream side so as to allow the movement of a card through the opening 26 in a first direction only, from the second cassette 24 to the first cassette 22. This opening 26 is opened when the member 25 retracts upwards (perpendicular to the movement of the card) in response to a card pressing against the inclined surface. In an alternative example the retractable member 25 may be provided in the form of a gate which may be opened or closed by a motor or solenoid in response to an electrical output issued from the cassette controller 29. For example, the cassette controller 29 may close said gate when a card is detected by the first sensor 50 and open the gate when a card is not detected by the first sensor 50. A gate may be harder to manufacture than a spring biased member however it may also be more reliable and secure than a spring biased member.

The second feed device 57 is configured to move a lowermost card from the second stack in either a first direction towards the aperture 26 (or potentially in a second direction away from said aperture 26). The second feed device 57 is directed towards, and abuts onto, the first feed device 27 so that a card may be transferred from the second stack to the position at which an end card from the first cassette 22 would typically sit. A single or common transport path is hence provided by the combination of the first feed device 27 and the second feed device 57 for moving an end card from the first 22 and second cassettes 24 towards a dispense position 21. The first feed device 27 and second feed device 57 are controlled by the cassette controller 29, which is also in electrical communication with the card communication module 23 and the first and second sensors, as shown by the dashed communication lines. In the example where a gate is provided, this gate may be opened or closed by the cassette controller 29, depending on which feed device 27, 57 is being used.

Figure 10:
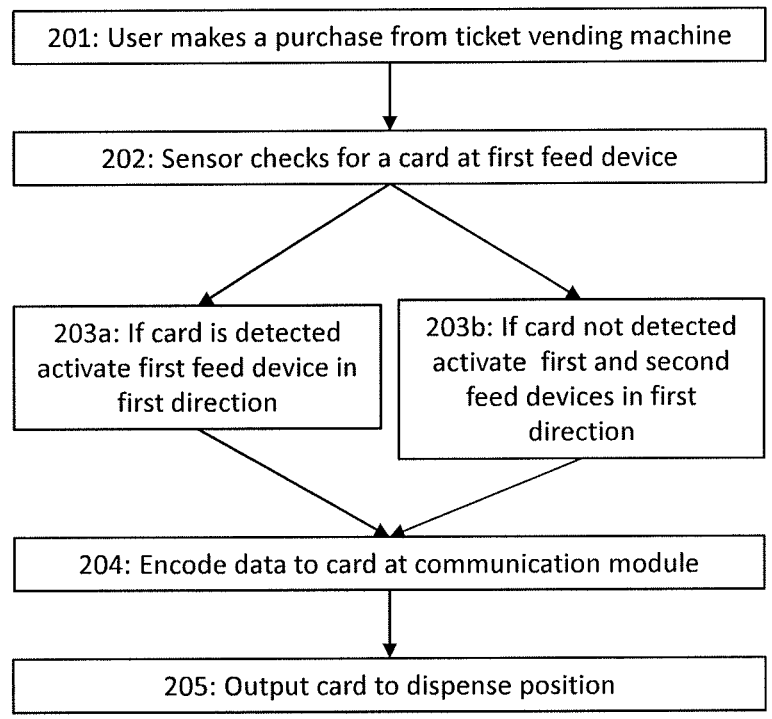
FIG. 10 is a flow chart of a method for operating a card dispenser in accordance with an example of the invention.

A method for operating the card dispenser 20 will now be discussed with reference to the flow chart of FIG. 10. At step 201, a user purchases of a card from the ticket vending machine. At step 202, the cassette controller 29 checks the output from a first sensor 50 to determine if a card is present within the first cassette 22 at the first feed device 27.

If a card 1 is detected at the base of the first cassette 22 (as shown by FIG. 8), the first feed device 27 is activated by the cassette controller 29 so as to move the end card 1, which is substantially planar, in a first direction at step 203*a* through opening 28 and the card communication module 23 towards the dispense position 21. Alternatively, in the event that a card is not detected by the first sensor 50, i.e. if the first cassette is empty, the cassette controller activates the first and second feed devices 27, 57 at step 203*b*. Movement of the second feed device 57 drives a lowermost card 1″ in the second stack in a first direction towards the inclined surface of the retractable member 25. Movement of the card 1″ against said inclined surface causes the member 25 to lift such that the card 1″ is transported from the second cassette 24 to the first cassette 22 through the opening 26, where it is subsequently carried by the first feed device 27. This is step 203*b* and is shown by FIG. 9. The opening 26 automatically closes once the card 1″ has passed through the opening 26 due to the force of a spring pressing against the retractable member 25.

At step 204, data is 'read only' or written onto the card 1,1″ by the card communication module 23 in accordance with the user's purchase. Once data has been encoded onto the card 1 and the card 1 has passed through the communication module 23, in the event that the card 1 includes a magnetic strip, the cassette controller 29 may issue a signal to the first feed device at step 205 causing it to reverse direction, so as to move the card 1 in a second direction opposite to the first direction, back through the communication module 23. The data encoded onto the card 1 is then read by the module 23 and checked against the source data to see if it is corrupted. It is advantageous for the opening to remain closed whilst the card 1 is moving in the second direction so as to prevent any cards in the first cassette 22 from being transferred into the second cassette 24. This is also true in the event that the direction of the first feed device is reversed to clear a card jam that has occurred, for example due to cards within the first stack having adhered together. In this example this is achieved by ensuring that the surface of the retractable member 25 that is configured to engage with a card inside the first cassette 22 is perpendicular to the second direction of movement. In the cross section of FIGS. 8 and 9 this shown as a flat vertical surface.

Provided that the data has not been corrupted, the communication module 23 will issue a signal to the cassette controller 29 causing it to again activate the first feed device 27 in the first direction so as to dispense the card 1 from the bezel 21 in the first direction. If the data is corrupted, the card 1 may be dispensed to an internal capture region (not shown). Optionally, an end card may be automatically moved from the second cassette 24 into the first cassette 22 so as to self 'prime' the first cassette 22 if the sensor 50 indicates that the first cassette 22 is empty, each time a card is issued or captured from the communication position.

Figure 11:
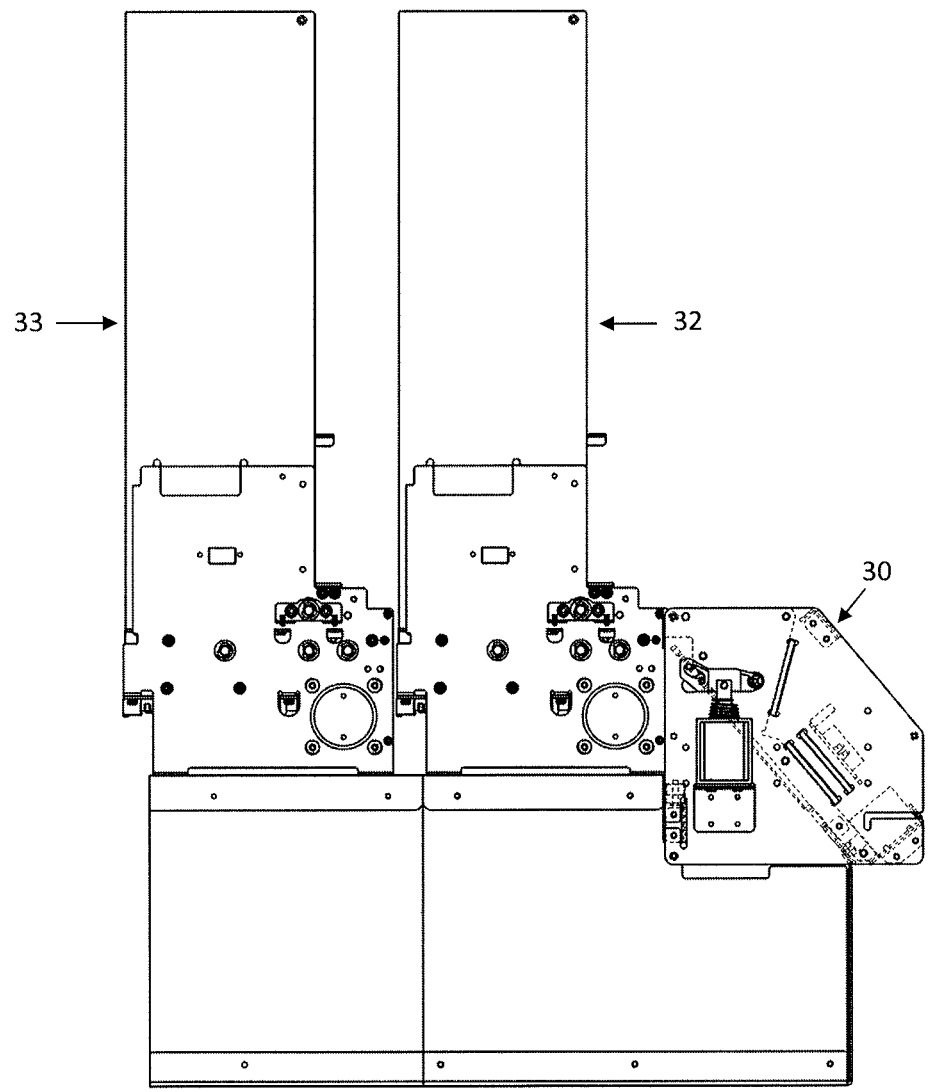
FIG. 11 is an illustration of a second example of a card dispenser.
Figure 12:
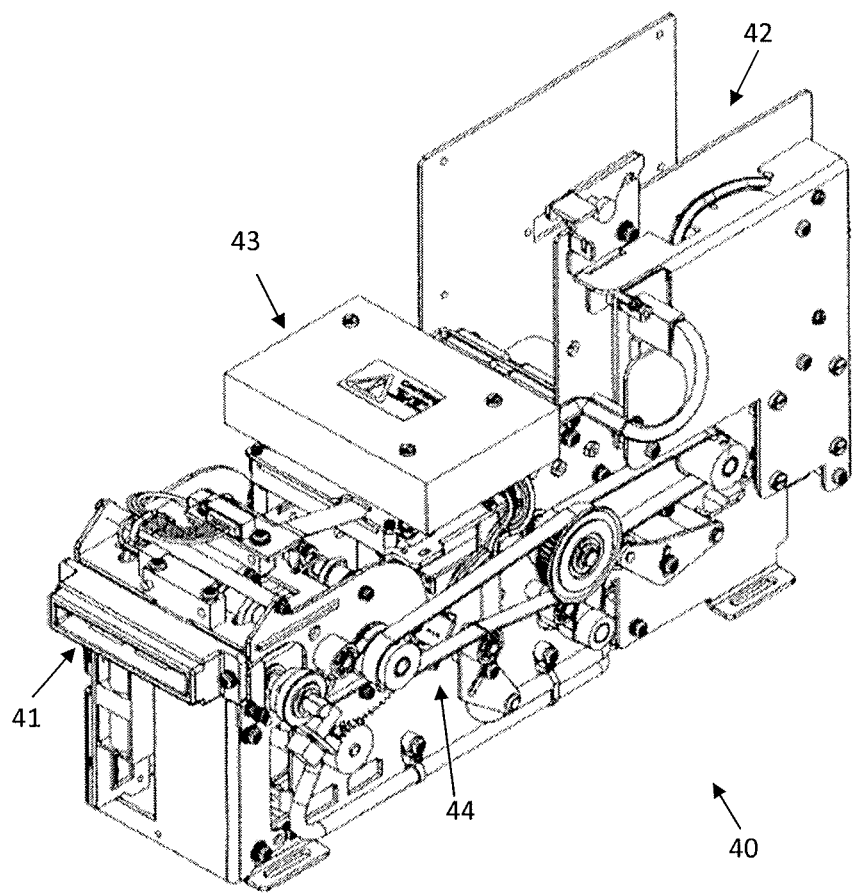
FIG. 12 is an illustration of a prior art card handling device.

A cross-sectional illustration of a second example of a card dispenser is shown by FIG. 11. This example is similar to the previous example however the first 32 and second cassettes 33 are configured to feed a card into a card handling device 30 in accordance with an example of the invention previously described with reference to FIG. 1. The dispense position in this case could be considered as the entrance aperture to the device 30. The combination of these two concepts is particularly advantageous as it allows for a relatively small card dispenser to be built with a high reliability and wherein a user does not have to wait for cartridges of cards to be refilled or moved into position in order to purchase a card from the dispenser.

The invention claimed is:

1. A card dispenser comprising:
   a first card cassette having a back surface with an opening and a front surface with an opening, the first card cassette holding a first stack of cards, each card in the first stack being substantially planar;
   a first feed device operable to move an end card of the first stack of cards from the first cassette, in a first direction through the opening in the front surface of the first cassette, towards a dispense position, while the remaining cards in the first stack are held within the first cassette;
   a second card cassette having a front surface with an opening, the second card cassette holding a second stack of cards and located upstream of the first cassette, each card in the second stack being substantially planar; and
   a second feed device operable to move an end card of the second stack of cards from the second cassette in the first direction, through the opening in the front surface of the second cassette and the opening in the back surface of the first cassette, into the first cassette when the first cassette is empty and while the remaining cards of the second stack are held with the second cassette;
   the first card cassette and the second card cassette being connectable to, and detachable from, the first and second feed devices respectively;
   the first feed device being further operable to move the end card of the second stack of cards from the first cassette in the first direction, through the opening in the front surface of the first cassette, towards the dispense position; and
   a retractable member configured to prevent movement of a card in a second direction, opposite to the first direction, from the first cassette into the second cassette, the retractable member configured to be retracted into an open position in response to a card pressing against the retractable member and moving in the first direction from the second cassette towards the first cassette.

2. A card dispenser according to claim 1, wherein the cassettes are vertically arranged and wherein the end card of the first stack of cards and the end card of the second stack of cards is the lowermost card.

3. A card dispenser according to claim 1, further comprising a sensor configured to monitor the presence of an end card in the first cassette.

4. A card dispenser according to claim 1, wherein the retractable member is provided on the opening of the back surface of the first cassette or the front surface of the second cassette for opening and closing the respective opening.

5. A card dispenser according to claim 3, further comprising a cassette controller, wherein the cassette controller is configured to control the first feed device and the second feed device and automatically move the end card from the second cassette into the first cassette if the sensor indicates the first cassette is empty.

6. A card dispenser according to claim 1, wherein the retractable member comprises an inclined surface with respect to a horizontal and a vertical, wherein the retractable member is adapted to move in a non-parallel direction in response to the movement of a card against the inclined surface.

7. A card dispenser according to claim 1, wherein the retractable member is biased towards a closed position, wherein it prevents the movement of an end card from the first cassette to the second cassette, and will remain in the closed configuration in response to an end card pressing against the retractable member in a second direction from the first cassette towards the second cassette.

8. A card dispenser according to claim 1, wherein a first transport path is provided for moving an end card from the first cassette to the dispense position, and a second transport path is provided for moving an end card from the second cassette onto the first transport path at the first cassette.

9. A card dispenser according to claim 1, wherein the first and second feed devices each comprise a belt driven by a motor.

10. A card dispenser comprising:
    a first card cassette configured to hold a first stack of cards;
    a first feed device operable to move an end card of the first stack of cards from the first cassette, through an opening in a surface of the first cassette, towards a dispense position;
    a second card cassette configured to hold a second stack of cards located upstream of the first cassette;
    a second feed device operable to move an end card of the second stack of cards from the second cassette, through an opening in a surface of the second cassette, into the first cassette;
    a sensor configured to monitor the presence of the end card in the first cassette;
    a cassette controller configured to control the first feed device and the second feed device, and operate the second feed device to automatically move the end card from the second stack into the first cassette if the sensor indicates that the first cassette is empty;
    the first feed device being further operable to move the end card of the second stack of cards from the first cassette, through the opening in the surface of the first cassette, towards the dispense position; and a retractable member configured to prevent the movement of an end card from the first cassette into the second cassette, the retractable member configured to be retracted into an open position in response to an end card pressing against the retractable member and moving from the second cassette towards the first cassette.

* * * * *